(12) United States Patent
Shinohara

(10) Patent No.: US 8,190,342 B2
(45) Date of Patent: May 29, 2012

(54) HYDRAULIC VEHICLE

(75) Inventor: Shigeru Shinohara, Oyama (JP)

(73) Assignee: Komatsu Ltd., Tokyo (JP)

( * ) Notice: Subject to any disclaimer, the term of this patent is extended or adjusted under 35 U.S.C. 154(b) by 393 days.

(21) Appl. No.: 12/451,218

(22) PCT Filed: Apr. 9, 2008

(86) PCT No.: PCT/JP2008/056995

§ 371 (c)(1),
(2), (4) Date: Oct. 30, 2009

(87) PCT Pub. No.: WO2008/139798

PCT Pub. Date: Nov. 20, 2008

(65) Prior Publication Data

US 2010/0131163 A1    May 27, 2010

(30) Foreign Application Priority Data

May 9, 2007   (JP) ................. 2007-124176

(51) Int. Cl.
   *G06F 19/00* (2006.01)
(52) U.S. Cl. .................. 701/60; 74/732.1
(58) Field of Classification Search .......... 701/51, 701/60, 61; 60/405, 406; 74/731.1, 732.1; 180/305–308
   See application file for complete search history.

(56) References Cited

U.S. PATENT DOCUMENTS

| 5,946,910 | A | 9/1999 | Hayashi et al. |
| 6,336,518 | B1 | 1/2002 | Matsuyama |
| 7,243,755 | B2 * | 7/2007 | Legner ............... 180/307 |
| 7,252,020 | B2 * | 8/2007 | Gray et al. ........... 74/732.1 |
| 7,967,099 | B2 * | 6/2011 | Fausch .............. 180/308 |

FOREIGN PATENT DOCUMENTS

| JP | 61-089123 A | 5/1986 |
| JP | 63-150824 | 10/1988 |
| JP | 02-248763 A | 10/1990 |
| JP | 11-350539 A | 12/1999 |

OTHER PUBLICATIONS

Office Action for Swedish Patent Application No. 0950813-6, dated Aug. 19, 2010.
International Search Report mailed Jun. 10, 2008, issued on PCT/JP2008/056995.

\* cited by examiner

*Primary Examiner* — Richard M. Camby
(74) *Attorney, Agent, or Firm* — Edwards Wildman Palmer LLP

(57) ABSTRACT

A hydraulic vehicle provided with a running-system hydraulic unit 10 that includes a hydraulic pump 11 being configured to be driven by an engine E, a hydraulic motor 12 being configured to be driven by pressure oil discharged from the hydraulic pump 11, and a pair of running-system oil passages 13a and 13b connected between the hydraulic pump 11 and the hydraulic motor 12 for forming a closed circuit. The hydraulic vehicle is configured to be driven by the hydraulic motor 12 for running. The hydraulic vehicle includes: a backup pump 40 being configured to be driven by the engine E; a backup control valve 30, a backup oil passage 47, a high-pressure selection valve 47b that are configured to allow pressure oil discharged from the backup pump 40 to flow to one of the running-system oil passages that is higher in pressure than the other.

6 Claims, 1 Drawing Sheet

HYDRAULIC VEHICLE

TECHNICAL FIELD

The present invention relates to a hydraulic vehicle driven by a hydraulic motor operated through pressure oil supplied and circulated in a hydraulic closed circuit by a hydraulic pump.

BACKGROUND ART

In some vehicles such as wheel loaders and bulldozers used as construction machines, a running-system hydraulic unit called 'hydro-static transmission (HST)' is installed between an engine and driving wheels. The running-system hydraulic unit includes a hydraulic pump configured to be driven by the engine, a hydraulic motor configured to be driven by pressure oil supplied from the hydraulic pump, and a pair of running-system oil passages connected between the hydraulic pump and the hydraulic motor for forming a closed circuit. Driving power of the hydraulic motor of the running-system hydraulic unit is transmitted to the wheels of the vehicle so that the vehicle can run.

In the case of a hydraulic vehicle driven by such a running-system hydraulic unit, specifications such as the maximum discharge amount of a hydraulic pump or the maximum capacity of a hydraulic motor are usually determined primarily based on the pulling force requirement. In this case, the maximum velocity of the vehicle is also inevitably determined by the specifications of the hydraulic pump and the hydraulic motor, and thus, market demands may not be satisfied.

In an attempt proposed to address the above-mentioned problem of the related art, a backup pump configured to be driven by an engine, and a backup motor configured to be driven by pressure oil discharged from the backup pump are installed, and it is configured such that output torque of the backup motor is added to output torque of a hydraulic motor through a speed reducer according to the operation of a backup selection valve. According to this technique of the related art, regardless of the specifications of a running-system hydraulic unit, the total output power can be increased by operating the backup selection valve, and thus the maximum velocity of a vehicle can be increased while maintaining a required towing force level (For example, refer to Patent Document 1).

Patent Document 1: Japanese Patent Application Laid-open No. 11-350539

DISCLOSURE OF INVENTION

Problem to be Solved by the Invention

In the above-described structure, the backup pump can be configured by using an existing charge hydraulic pump that is used in the related art for supplying pressure oil to an working-machine hydraulic actuator. However, the speed reducer or the backup motor may be newly installed at the hydraulic motor of the running-system hydraulic unit, and thus it may not be preferable in terms of installation space.

Accordingly, the invention provides a hydraulic vehicle of which the maximum velocity can be increased without having to increase installation space of the vehicle.

Means for Solving Problem

According to an aspect of the present invention, a hydraulic vehicle is provided with a running-system hydraulic unit that includes a hydraulic pump being configured to be driven by an engine, a hydraulic motor being configured to be driven by pressure oil discharged from the hydraulic pump, and a pair of running-system oil passages connected between the hydraulic pump and the hydraulic motor for forming a closed circuit. The hydraulic vehicle is configured to be driven by the hydraulic motor for running. The hydraulic vehicle includes: a backup pump being configured to be driven by the engine; a backup pressure oil supply unit being configured to allow pressure oil discharged from the backup pump to flow to one of the running-system oil passages that is higher in pressure than the other when pressure oil is supplied from the hydraulic pump to the hydraulic motor; and a drain unit being configured to drain pressure oil from the other of the running-system oil passages when the pressure oil is allowed to flow to the one of the running-system oil passages through the backup pressure oil supply unit.

Advantageously, in the hydraulic vehicle, the backup pressure oil supply unit includes a high-pressure selection valve being configured to operate according to a pressure difference between the pair of the running-system oil passages, and the backup pressure oil supply unit is configured to supply the pressure oil from the backup pump to one of the running-system oil passages selected by the high-pressure selection valve, and the drain unit includes a low-pressure selection valve being configured to operate according to a pressure difference between the pair of the running-system oil passages, and the drain unit is configured to drain the pressure oil from one of the running-system oil passages selected by the low-pressure selection valve.

Advantageously, the hydraulic vehicle further includes a vehicle velocity detection unit being configured to detect a velocity of the hydraulic vehicle. The backup pressure oil supply unit comprises a backup control unit being configured to control a flow of pressure oil from the backup pump to the running-system oil passage based on a velocity detected by using the vehicle velocity detection unit.

Advantageously, in the hydraulic vehicle, the backup pressure oil supply unit comprises a flowrate control circuit being configured to control a discharge amount of the backup pump so as to make a difference between a discharge pressure of the backup pump and a load pressure of the running-system hydraulic unit constant.

Advantageously, the hydraulic vehicle further includes at least one working-machine hydraulic unit that includes a working-machine hydraulic actuator being configured to drive a working-machine and a working-machine control valve being configured to control supply of pressure oil to the working-machine hydraulic actuator. The backup pressure oil supply unit includes a flowrate control circuit being configured to connect the working-machine hydraulic unit to the running-system hydraulic unit in parallel, to supply the pressure oil from the backup pump to each of the running-system hydraulic unit and the working-machine hydraulic unit through an separate pressure compensation valve, and to control a discharge amount of the backup pump so as to make a difference between a discharge pressure of the backup pump and a maximum load pressure of the running-system hydraulic unit and the working-machine hydraulic unit constant.

Advantageously, in the hydraulic vehicle, the backup pressure oil supply unit includes a backup control valve disposed between the backup pump and the running-system hydraulic unit to increase an output flowrate according to a manipulation amount.

Effect of the Invention

According to the invention, since the maximum velocity of the vehicle can be increased by supplying pressure oil discharged from the backup pump to the hydraulic motor, it is unnecessary to install a backup motor or a speed reducer at the hydraulic motor, and thus a large installation space is not required. In addition, since pressure oil supplied through the backup pressure oil supply unit is drained through the drain unit, undesired influence such as an increase of load acting on the hydraulic pump is not exercised on the closed-circuit running-system hydraulic unit.

BRIEF DESCRIPTION OF DRAWINGS

EXPLANATIONS OF LETTERS OR NUMERALS 10 running-system hydraulic unit
11 hydraulic pump
12 hydraulic motor
13a, 13b running-system oil passages
20A, 20B working-machine hydraulic units
21A, 21B working-machine hydraulic actuators
22A, 22B working-machine control valves
30 backup control valve
31 electric proportional valve
40 backup pump
41 oblique cylinder actuator
42 load pressure sensitive switch valve
42a setting spring
43 load pressure output oil passage
44 working-machine oil passage
45A, 45B, 45C pressure compensation valve
47 backup oil passage
47b high-pressure selection valve
48 drain passage
48a low-pressure selection valve
100 controller
101 vehicle velocity sensor
E engine Best Mode(s) for Carrying Out The Invention Hereinafter, with reference to the accompanying drawing, a hydraulic vehicle will be described in detail according to an preferred embodiment of the invention.
Embodiment FIG. 1 illustrates a hydraulic circuit diagram of a hydraulic vehicle according to an embodiment of the invention. The hydraulic vehicle may be used as a construction machine such as a wheel loader or a bulldozer. The hydraulic vehicle includes a running-system hydraulic unit 10, two working-machine hydraulic units 20A and 20B, and a backup control valve 30.

Figure 1:
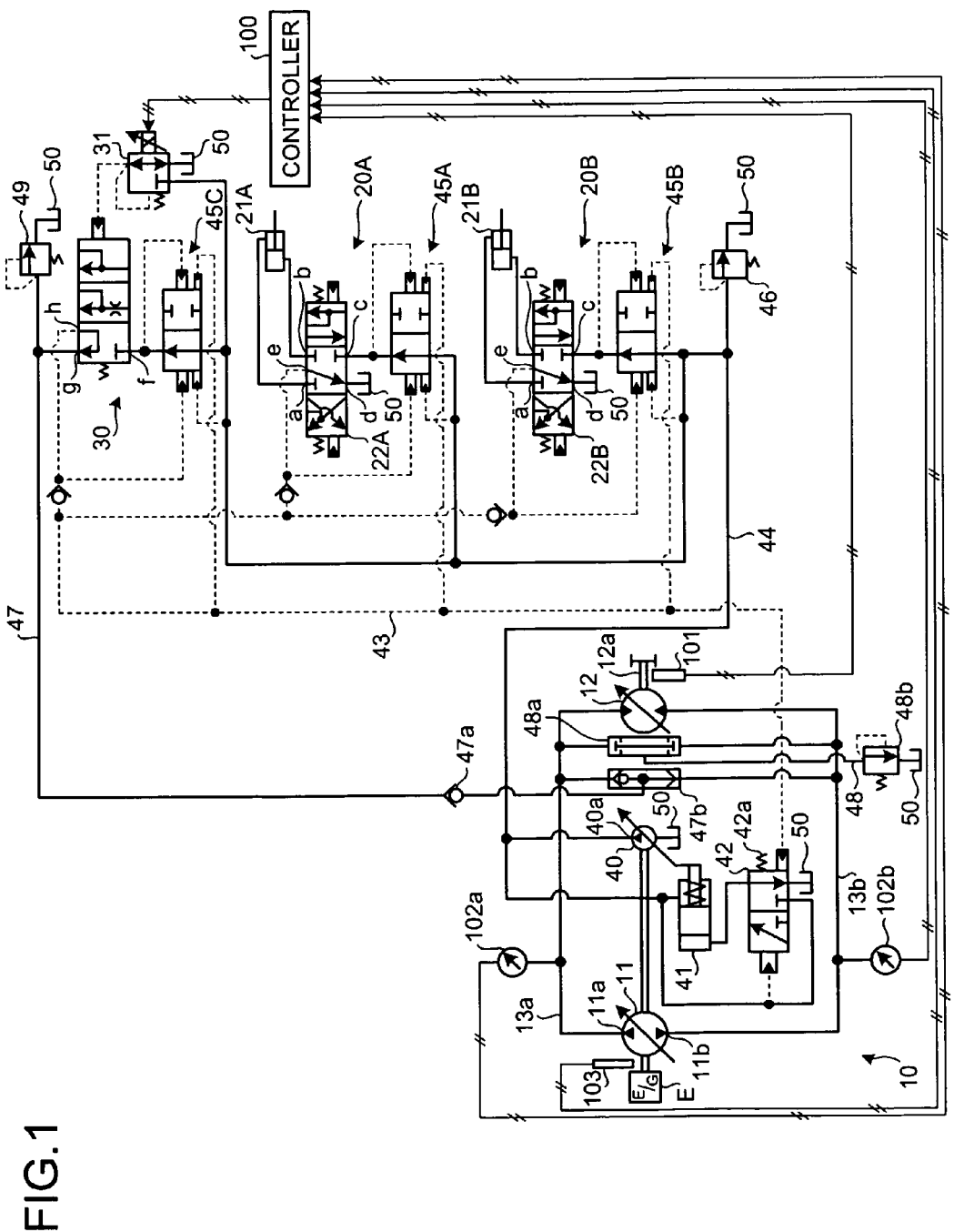
FIG. 1 illustrates a hydraulic circuit diagram of a hydraulic vehicle according to an embodiment of the invention.

The running-system hydraulic unit 10 is called 'Hydro-Static Transmission (HST)'. The running-system hydraulic unit 10 includes a hydraulic pump 11 configured to be driven by an engine E, a hydraulic motor 12 configured to be driven by pressure oil supplied from the hydraulic pump 11, and a pair of running-system oil passages 13a and 13b connected between the hydraulic pump 11 and the hydraulic motor 12 for forming a closed circuit. Each of the hydraulic pump 11 and the hydraulic motor 12 is a variable displacement hydraulic device of which the capacity can be adjusted by varying the tilting angle of a wobble plate. An output shaft 12a of the hydraulic motor 12 is connected to driving wheels of the hydraulic vehicle through a speed reducer (not shown), such that the hydraulic vehicle can be driven for running by rotating the driving wheels using the hydraulic motor 12. The rotation direction of the hydraulic motor 12 is changed according to the direction of pressure oil supply from the hydraulic pump 11, so that the vehicle can be moved forward or backward. In the following description, the running-system oil passage 13a connected to an upper discharge port 11a of the hydraulic pump 11 as shown in FIG. 1 will be referred to as an "upper oil passage", and the running-system oil passage 13b connected to a lower discharge port 11b of the hydraulic pump 11 will be referred to as a "lower oil passage".

The working-machine hydraulic units 20A and 20B are used for construction works such as excavation and loading. The operational hydraulic units 20A and 20B respectively include: working-machine hydraulic actuators 21A and 21B configured to drive a working-machine; and working-machine control valves 22A and 22B configured to control supply of pressure oil to the working-machine hydraulic actuators 21A and 21B. In the current embodiment, each of the working-machine control valves 22A and 22B is configured to be operated by manipulation pilot pressure generated according to handling of a manipulation lever (not shown), so as to selectively connect (switch) a supply port c and a drain port d to two actuator ports a and b connected to each oil chambers of the working-machine hydraulic actuator 21A and 21B. Furthermore, a load pressure output port e is installed at each of the working-machine control valves 22A and 22B, such that when pressure oil is supplied to the working-machine hydraulic actuator 21A and 21B from the supply port c, the discharge pressure of the pressure oil can be output as a load pressure at the load pressure output port e.

The backup control valve 30 is operated according to pilot pressure from an electric proportional valve 31 in a manner such that the size of an opening between an input port f and an output port g is gradually increased from a completely closed state according to the level of the pilot pressure. At the backup control valve 30, a load pressure output port h is installed. When pressure oil is supplied to the backup control valve 30 in a direction from the input port f to the output port g, the discharge pressure of the pressure oil is output at the load pressure output port h as a load pressure.

In addition, the hydraulic vehicle includes a backup pump 40. Like the hydraulic pump 11, the backup pump 40 is driven by the engine E. The capacity of the backup pump 40 can be adjusted by operating an oblique cylinder actuator 41. The oblique cylinder actuator 41 is configured to be extended and retracted according to the operation of a load pressure sensitive switch valve 42.

Owing to the load pressure sensitive switch valve 42, the discharge pressure of the backup pump 40 can be balanced with a load pilot pressure transmitted through a load pressure output oil passage 43 and the pressing force of a setting spring 42a. For example, if the load pressure transmitted through the load pressure output oil passage 43+the pressing force of the setting spring 42a is greater than the discharge pressure of the backup pump 40, the load pressure sensitive switch valve 42 retracts the oblique cylinder actuator 41 (move the oblique cylinder actuator 41 to the left in FIG. 1) so as to increase the capacity of the backup pump 40. Among output pressures of the load pressure output ports e of the working-machine control valves 22A and 22B of the working-machine hydraulic units 20A and 20B and an output pressure of the load pressure output port h of the backup control valve 30, the highest output pressure is applied as a load pilot pressure to the load pressure sensitive switch valve 42 through the load pressure output oil passage 43. As a result, the backup pump 40 is controlled by the load pressure sensitive switch valve 42 in a manner such that the pressure of pressure oil discharged from the backup pump 40 is greater by a set pressure of the setting spring 42*a* than the highest output pressure (load pilot pressure) among output pressures of the working-machine control valves 22A and 22B and the backup control valve 30.

A working-machine oil passage 44 is connected to a discharge port 40*a* of the backup pump 40. The downstream side of the working-machine oil passage 44 is divided into three branches and connected to the supply ports C of the working-machine control valves 22A and 22B of the working-machine hydraulic units 20A and 20B and the input port f of the backup control valve 30 through individual pressure compensation valves 45A, 45B, and 45C. The pressure compensation valve 45A (hereinafter, also referred to as an "working-machine pressure compensation valve") installed between the backup pump 40 and the working-machine control valve 22A is operated according to the balance between (the pressure of pressure oil supplied through the working-machine oil passage 44+the output pressure of the load pressure output port e of the working-machine control valve 22A) and (the load pilot pressure of the load pressure output oil passage 43+the discharge pressure of the working-machine pressure compensation valve 45A). If (the load pilot pressure of the load pressure output oil passage 43+the discharge pressure of the working-machine pressure compensation valve 45A) is greater than (the pressure of pressure oil supplied through the working-machine oil passage 44+the output pressure of the load pressure output port e of the working-machine control valve 22A), the working-machine pressure compensation valve 45A operates to reduce the flowrate of pressure oil supplied from the working-machine oil passage 44 to the working-machine control valve 22A. The pressure compensation valve 45B (hereinafter, also referred to as an "working-machine pressure compensation valve") installed between the backup pump 40 and the working-machine control valve 22B is operated according to the balance between (the pressure of pressure oil supplied through the working-machine oil passage 44+the output pressure of the load pressure output port e of the working-machine control valve 22B) and (the load pilot pressure of the load pressure output oil passage 43+the discharge pressure of the working-machine pressure compensation valve 45B). If (the load pilot pressure of the load pressure output oil passage 43+the discharge pressure of the working-machine pressure compensation valve 45B) is greater than (the pressure of pressure oil supplied through the working-machine oil passage 44+the output pressure of the load pressure output port e of the working-machine control valve 22B), the working-machine pressure compensation valve 45B operates to reduce the flowrate of pressure oil supplied from the working-machine oil passage 44 to the working-machine control valve 22B. The pressure compensation valve 45C (hereinafter, also referred to as an "backup pressure compensation valve") installed between the backup pump 40 and the backup control valve 30 is operated according to the balance between (the pressure of pressure oil supplied through the working-machine oil passage 44+the output pressure of the load pressure output port h of the backup control valve 30) and (the load pilot pressure of the load pressure output oil passage 43+the discharge pressure of the backup pressure compensation valve 45C). If (the load pilot pressure of the load pressure output oil passage 43+the discharge pressure of the backup pressure compensation valve 45C) is greater than (the pressure of pressure oil supplied through the working-machine oil passage 44+the output pressure of the load pressure output port h of the backup control valve 30), the backup pressure compensation valve 45C operates to reduce the flowrate of pressure oil supplied from the working-machine oil passage 44 to the backup control valve 30. In addition, a main relief valve 46 is installed at the working-machine oil passage 44.

In addition, the hydraulic vehicle includes a backup oil passage (backup pressure oil supply unit) 47 and a drain passage (drain unit) 48. One end of the backup oil passage 47 is connected to the output port g of the backup control valve 30, and the other end of the backup oil passage 47 is divided and connected to the upper oil passage 13*a* and the lower oil passage 13*b* of the running-system hydraulic unit 10 through a check valve 47*a* and a high-pressure selection valve 47*b*. In addition, a confluence pressure setup relief valve 49 is provided to limit the pressure of pressure oil supplied through the backup oil passage 47.

An end of the drain passage 48 is divided and connected to the upper oil passage 13*a* and the lower oil passage 13*b* of the running-system hydraulic unit 10 through a low-pressure selection valve 48*a*, and the other end of the drain passage 48 is connected to a oil tank 50 through flushing relief valve (drain unit) 48*b*.

At the hydraulic vehicle, a controller (backup control unit) 100 is installed. A vehicle velocity detection signal of a vehicle velocity sensor 101 installed at the output shaft 12*a* of the hydraulic motor 12, pressure detection signals of oil pressure sensors 102*a* and 102*b* respectively installed at the upper oil passage 13*a* and the lower oil passage 13*b*, an engine speed detection signal of an engine speed sensor 103 installed at an output shaft of the engine E are input to the controller 100 as input signals. Based on the input signals, the controller 100 outputs a control signal to the electric proportional valve 31, and the backup control valve 30 is continually switched according to the pilot pressure of the electric proportional valve 31.

In the above-described hydraulic vehicle, when the engine E runs, the hydraulic pump 11 is operated such that pressure oil can be supplied and circulated in a state where the discharge direction and amount of the pressure oil is determined according to the tilting angle of the wobble plate of the hydraulic pump 11. When the pressure oil discharged from the hydraulic pump 11 is supplied and circulated, the hydraulic motor 12 is rotated according to the circulation direction of the pressure oil, and the hydraulic vehicle is moved in a desired direction according to the rotation direction of the hydraulic motor 12. The running direction of the hydraulic vehicle can be changed by varying the discharge direction of the pressure oil from the hydraulic pump 11, and the velocity or towing force of the hydraulic vehicle can be changed by varying the tilting angle of the wobble plate of the hydraulic pump 11 or the hydraulic motor 12.

In the above-described operation of the hydraulic vehicle, the backup pump 40 is continuously operated by the engine E. Therefore, for example, if the working-machine control valves 22A and 22B of the working-machine hydraulic units 20A and 20B are manipulated, pressure oil is supplied to the working-machine hydraulic actuators 21A and 21B according to the manipulation of the working-machine control valves 22A and 22B, and thus a desired construction work can be carried out by using an working-machine operated by the working-machine hydraulic actuators 21A and 21B. At this time, in the hydraulic vehicle, pressure oil is supplied to the working-machine hydraulic actuators 21A and 21B through the working-machine pressure compensation valves 45A and 45B, respectively. Therefore, even when the plurality of working-machine hydraulic actuators 21A and 21B are simultaneously operated, regardless of the difference of loads applied to the working-machine hydraulic actuators 21A and 21B, pressure oil can be supplied in a state where the amount of the pressure oil is distributed in proportion to opened areas of the working-machine control valves 22A and 22B.

When the hydraulic vehicle is in a running state, the controller 100 continuously monitors the velocity of the hydraulic vehicle by using, for example, the vehicle velocity sensor 101, and based on the monitoring result, the controller 100 outputs a control signal to the electric proportional valve 31.

At this time, if the hydraulic vehicle runs at a velocity lower than a preset backup vehicle velocity (for example, 30 km/hour), the controller 100 outputs a control signal to the electric proportional valve 31 so as to close the backup control valve 30. As a result, pressure oil does not flow in the backup oil passage 47 from the backup control valve 30.

If the velocity of the hydraulic vehicle increases to the preset backup vehicle velocity, the controller 100 outputs a control signal to the electric proportional valve 31 so as to increase the opened area of the backup control valve 30. As a result, pressure oil discharged from the backup pump 40 is allowed to flow to the running-system oil passages 13a and 13b of the running-system hydraulic unit 10 through the working-machine oil passage 44, the backup pressure compensation valve 45C, the backup control valve 30, the backup oil passage 47, and the high-pressure selection valve 47b. The flowrate of pressure oil output from the backup control valve 30 is adjusted according to the manipulation amount, that is, according to a pilot pressure applied by the electric proportional valve 31. In this case, since pressure oil discharged from the backup pump 40 is also supplied to the backup control valve 30 through the backup pressure compensation valve 45C, although the working-machine hydraulic actuators 21A and 21B are simultaneously operated, regardless of a load difference between the working-machine hydraulic actuators 21A and 21B, pressure oil can be distributed according to the opened area of the backup control valve 30 and supplied to the running-system oil passages 13a and 13b.

Here, by the high-pressure selection valve 47b, one of the running-system oil passages 13a and 13b which have a relatively high oil process is selected. That is, one of the running-system oil passages 13a and 13b through which pressure oil is supplied from the hydraulic pump 11 to the hydraulic motor 12 is selected. Therefore, if pressure oil discharged from the backup pump 40 is introduced, the flowrate of pressure oil supplied from the hydraulic pump 11 to the hydraulic motor 12 is increased so that the hydraulic vehicle can run at a velocity higher that the maximum velocity determined by the specifications of the running-system hydraulic unit 10 such as the maximum discharge amount of the hydraulic pump 11 or the minimum capacity of the hydraulic motor 12. As a result, the hydraulic vehicle may be advantageously used for works such as a snow-removing work of which the work efficiency is largely dependent on the velocity of the hydraulic vehicle rather than the towing force of the hydraulic vehicle.

In addition, after pressure oil passes through the hydraulic motor 12, the pressure oil is directed to the drain passage 48 via the low-pressure selection valve 48a and is drained to the oil tank 50 through the flushing relief valve 48b. That is, the circuit pressure of the lower-pressure passage of the running-system oil passages 13a and 13b is adjusted by a preset pressure of the flushing relief valve 48b, and pressure oil supplied from the backup pump 40 is drained. Therefore, the amount of pressure oil returning to the hydraulic pump 11 is not greater than the amount of pressure oil discharged from the hydraulic pump 11, and undesired influence such as an increase of load acting on the hydraulic pump 11 is not exercised on the closed-circuit running-system hydraulic unit 10 by pressure oil supplied from the backup pump 40.

In addition, pressure oil more than the maximum discharge amount of the hydraulic pump 11 can be supplied to the hydraulic motor 12 by operating the backup control valve 30 without having to change the specifications of the running-system hydraulic unit 10. Therefore, the towing force of the HST circuit designed for the hydraulic vehicle can be maintained. Furthermore, since it is unnecessary to install a bulky mechanical component such as a backup motor or a speed reducer, installation space can be saved.

Furthermore, in the above-described embodiment, if the velocity of the hydraulic vehicle exceeds a preset backup vehicle velocity, the backup control valve 30 is operated through the electric proportional valve 31 in response to a control signal output from the controller 100, so as to supply pressure oil discharged from the backup pump 40 to the running-system oil passages 13a and 13b of the running-system hydraulic unit 10. That is, when the hydraulic vehicle runs and a working-machine is not used, a surplus flowrate of the backup pump 40 is used. However, the invention is not limited thereto. For example, a manipulation lever or a manipulation switch may be installed, which is capable of output a manipulation signal for the backup control valve 30, so as to operate the backup control valve 30 for supplying pressure oil discharged from the backup pump 40 to the running-system oil passages 13a and 13b of the running-system hydraulic unit 10 in response to a manipulation action of an operator.

Moreover, in the above-described embodiment, the controller 100 outputs a control signal to the electric proportional valve 31 based on a vehicle velocity detection signal of the vehicle velocity sensor 101. However, other devices can be used instead of the vehicle velocity sensor 101. For example, the controller 100 can output a control signal to the electric proportional valve 31 based on pressure detection signals of the oil pressure sensors 102a and 102b installed at the running-system oil passages 13a and 13b of the running-system hydraulic unit 10 illustrated in FIG. 1 and an engine speed detection signal of the engine speed sensor 103 installed at the output shaft 12a of the engine E. In detail, when the engine speed detection signal of the engine speed sensor 103 is maximum (the speed of the engine E is maximum) and pressure detection signals of the oil pressure sensors 102a and 102b are greater than a preset pressure (for example, 20 MPa), the controller 100 may output a control signal to the electric proportional valve 31 so as to supply pressure oil discharged from the backup pump 40 to the running-system oil passages 13a and 13b of the running-system hydraulic unit 10.

Moreover, in the above-described embodiment, two working-machine hydraulic units are described. However, the number of working-machine hydraulic units is not limited to two.

Industrial Applicability

As described above, the invention is useful applicable to a hydraulic vehicle that is driven for running by a hydraulic motor operated through pressure oil supplied and circulated from a hydraulic pump via a hydraulic closed circuit. In addition, since it is unnecessary to install a backup motor or a speed reducer at the hydraulic motor, a large installation space is not required. Furthermore, since pressure oil supplied from a backup pressure oil supply unit is eventually drained to a drain unit, undesired influence, such as an increase of load acting on the hydraulic pump, is not exercised on a closed-circuit running-system hydraulic unit.

The invention claimed is:

1. A hydraulic vehicle provided with a running-system hydraulic unit that includes a hydraulic pump being configured to be driven by an engine, a hydraulic motor being configured to be driven by pressure oil discharged from the hydraulic pump, and a pair of running-system oil passages connected between the hydraulic pump and the hydraulic motor for forming a closed circuit, the hydraulic vehicle being configured to be driven by the hydraulic motor for running, the hydraulic vehicle comprises:

a backup pump being configured to be driven by the engine;

a backup pressure oil supply unit being configured to allow pressure oil discharged from the backup pump to flow to one of the running-system oil passages that is higher in pressure than the other when pressure oil is supplied from the hydraulic pump to the hydraulic motor; and a drain unit being configured to drain pressure oil from the other of the running-system oil passages when the pressure oil is allowed to flow to the one of the running-system oil passages through the backup pressure oil supply unit.

2. The hydraulic vehicle of claim 1, wherein the backup pressure oil supply unit includes a high-pressure selection valve being configured to operate according to a pressure difference between the pair of the running-system oil passages, and the backup pressure oil supply unit is configured to supply the pressure oil from the backup pump to one of the running-system oil passages selected by the high-pressure selection valve, and the drain unit includes a low-pressure selection valve being configured to operate according to a pressure difference between the pair of the running-system oil passages, and the drain unit is configured to drain the pressure oil from one of the running-system oil passages selected by the low-pressure selection valve.

3. The hydraulic vehicle of claim 1, further comprising a vehicle velocity detection unit being configured to detect a velocity of the hydraulic vehicle, wherein the backup pressure oil supply unit comprises a backup control unit being configured to control a flow of pressure oil from the backup pump to the running-system oil passage based on a velocity detected by using the vehicle velocity detection unit.

4. The hydraulic vehicle of claim 1, wherein the backup pressure oil supply unit comprises a flowrate control circuit being configured to control a discharge amount of the backup pump so as to make a difference between a discharge pressure of the backup pump and a load pressure of the running-system hydraulic unit constant.

5. The hydraulic vehicle of claim 1, further comprising at least one working-machine hydraulic unit that includes a working-machine hydraulic actuator being configured to drive a working-machine and a working-machine control valve being configured to control supply of pressure oil to the working-machine hydraulic actuator, wherein the backup pressure oil supply unit includes a flowrate control circuit being configured to connect the working-machine hydraulic unit to the running-system hydraulic unit in parallel, to supply the pressure oil from the backup pump to each of the running-system hydraulic unit and the working-machine hydraulic unit through an separate pressure compensation valve, and to control a discharge amount of the backup pump so as to make a difference between a discharge pressure of the backup pump and a maximum load pressure of the running-system hydraulic unit and the working-machine hydraulic unit constant.

6. The hydraulic vehicle of claim 1, wherein the backup pressure oil supply unit includes a backup control valve disposed between the backup pump and the running-system hydraulic unit to increase an output flowrate according to a manipulation amount.

* * * * *